United States Patent [19]

Agrawal et al.

[11] Patent Number: 5,555,517
[45] Date of Patent: Sep. 10, 1996

[54] APPARATUS AND METHOD FOR EFFICIENT CARRY SKIP INCREMENTATION

[75] Inventors: Sumeet Agrawal, Portland; Narayan Hegde, Beaverton, both of Oreg.

[73] Assignee: Intel Corporation, Santa Clara, Calif.

[21] Appl. No.: 368,479

[22] Filed: Jan. 4, 1995

[51] Int. Cl.[6] .......................................................... G06F 7/50
[52] U.S. Cl. ............................................. 364/770; 364/787
[58] Field of Search ..................................... 364/770, 784, 364/786, 787, 788

[56] References Cited

U.S. PATENT DOCUMENTS

| | | | |
|---|---|---|---|
| 4,905,180 | 2/1990 | Kumar | 364/787 |
| 5,027,310 | 6/1991 | Dalrymple | 364/770 |
| 5,136,539 | 8/1992 | Kumar | 364/787 |
| 5,198,993 | 3/1993 | Makakura | 364/788 |

*Primary Examiner*—Roy N. Envall, Jr.
*Assistant Examiner*—Chuong D. Ngo
*Attorney, Agent, or Firm*—Blakely, Sokoloff, Taylor & Zafman

[57] ABSTRACT

A carry-skip incrementor mitigating propagation delay experienced by conventional ripple carry incrementors without employing a substantially greater device count, includes a plurality of circuit blocks operating in combination with a plurality of logic gates. Each circuit block receives as input a varying number of data bits of an input operand and a carry signal and thereafter, generates a product signal and real bit sums corresponding to these data bits. The plurality of logic gates are arranged such that each logic gate receives as input the product signal from a first adjacent circuit block and the carry signal and outputs the carry signal for a second adjacent circuit block. The carry signal is active if the product signal and the carry signal are active. Thus, the delay associated with the first adjacent circuit block is bypassed in favor of the delay associated with the logic gate.

31 Claims, 5 Drawing Sheets

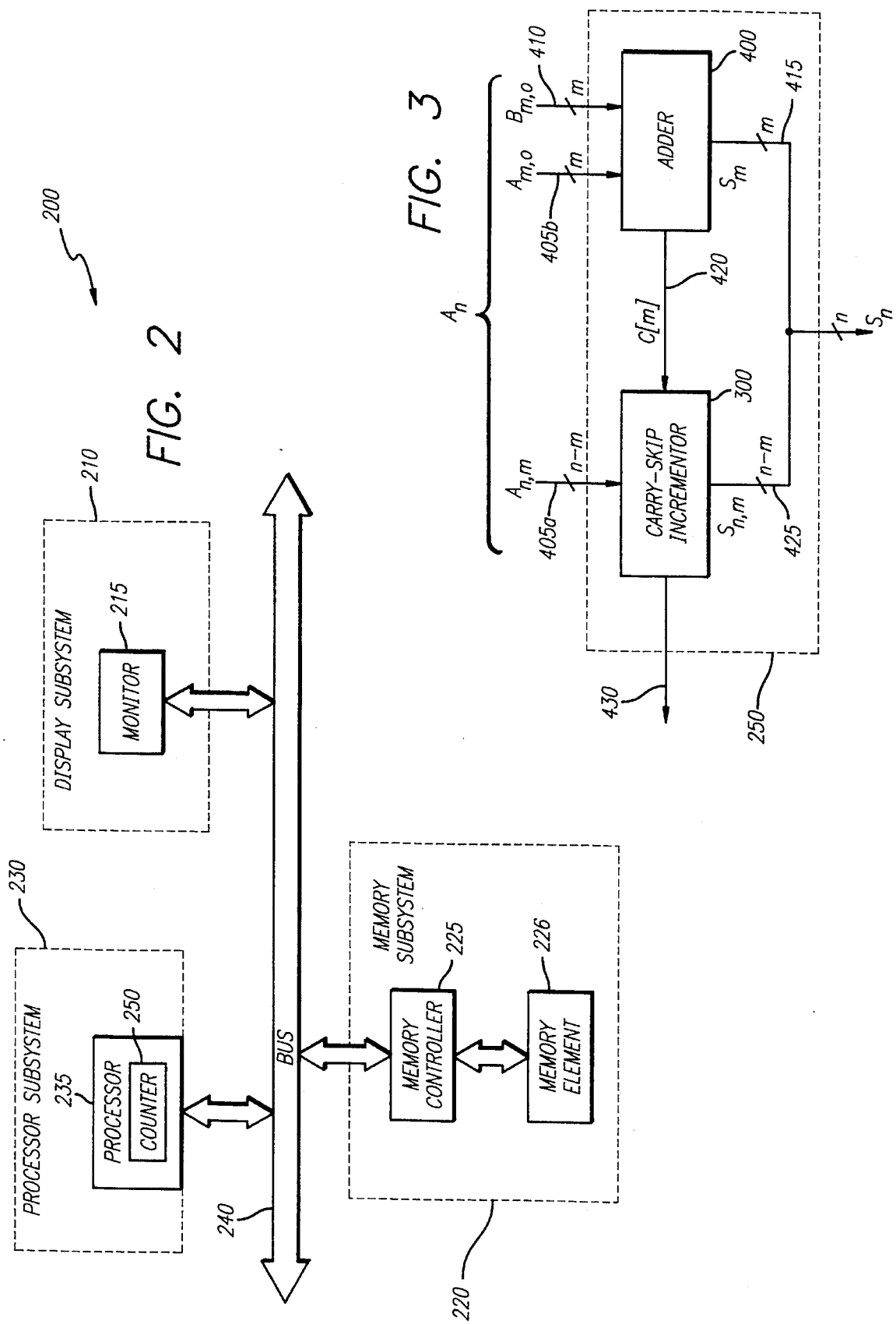

| FIG.4(A) | FIG.4(B) |

APPARATUS AND METHOD FOR EFFICIENT CARRY SKIP INCREMENTATION

BACKGROUND OF THE INVENTION

1. Field of the Invention

The present invention relates to the field of digital computation circuits. More specifically, the present invention relates to an incrementor based on a carry-skip technique and an optimal grouping of stages to selectively reduce total signal propagation delay.

2. Background Art Related to the Invention

Fundamental to the operations of any computer is the microprocessor. The microprocessor performs a number of arithmetical or logical "bitwise" calculations on its various inputs. One necessary arithmetic operation inherent in most advanced integrated circuit components, particularly microprocessors, is the ability to increment numbers in order to monitor the occurrence of events during each clock cycle. Throughout the development of integrated circuit components, a constant emphasis has been placed on increasing their speed of operation. Typically, this is accomplished by reducing signal propagation delays encountered by the integrated circuit component in completing a particular arithmetic operation.

For example, in their early development, processors usually employed an "i" bit ripple-carry incrementor operating independently or as a part of a half-adder. As shown in FIG. 1, the "i" bit ripple-carry incrementor 100 includes "i" identical cells 105a–105i ("i" being arbitrary) serially connected together. Each of these cells 105a–105i receives as input a serially transmitted ripple carry bit "C[x]" ("x"≦"i") and a corresponding bit of a digital input operand $A_i$; namely, A[0] through A[i−1] respectively.

Each cell 105a–105i of the ripple-carry incrementor 100 comprises a XOR gate 110a–110i and an AND gate 115a–115i, which collectively enable each cell 105a–105i to perform two logical operations. Using the $K^{th}$ cell for illustrative purposes, its XOR gate 110k receives a ripple carry propagate "C[k−1]" bit from the K−$1^{th}$ cell (not shown) via a first input line 120 and an A[k−1] input bit via a second input line 125. Based on these inputs, the XOR gate 110k produces a real bit sum S[k−1] which is output from the incrementor 100 through a first output line 130. The $K^{th}$ cell also produces a ripple carry propagate "C[k]" bit via a second output line 135. The C[k] bit is a product of the C[k−1] bit logically AND'ed with the A[k−1] input bit. Thus, it is apparent that any ripple carry propagate output to a succeeding cell of the conventional ripple-carry incrementor 100 may be calculated by the following equation:

$$C[k]=(A[k-1]^*A[k-2]^*A[k-3]^* \ldots {}^* A[k-x])^*C[k-x],$$

where (i) "*" represents a logical AND operator; and (ii) "k" represents the bit location of the cell from the least significant bit ("k" being arbitrary); and (iii) "x" represents the number of cells displaced from the $k^{th}$ cell ("x" being arbitrary and less than "k").

Although the conventional ripple-carry incrementor 100 is simple and requires little area and device count being the overall number of transistors required by the incrementor, its total signal propagation delay to calculate the real bit sum "$S_i$" is unnecessarily large due to serial propagation of each ripple carry propagate. For example, for a 37-bit ripple-carry incrementor, the total signal propagation delay would be equal to the following:

$$\text{Total Delay}=(i-1)\times T_C+T_S=(37-1)\times T_C+T_S=37T_g$$

(i) $T_C$: Time delay for a carry to propagate through each cell, where $T_c$ is approximately equal to one gate delay "$T_g$"; and (ii) $T_S$: Time delay for calculating S[i−1], approximately "$T_g$".

Thus, the ripple carry incrementor lies on one end of a speed/count continuum.

In certain situations, it is desirable to decrease the total signal propagation delay in order to increase the operational speed of the incrementor. This may be accomplished by sacrificing some area and device count. For example, incrementors using carry lookahead or Kogge-Stone techniques are specifically designed to reduce signal propagation delay. Unfortunately, these incrementors require significantly larger area and device count than conventional ripple carry incrementors and thus, lie on an end of the speed/area continuum opposite the ripple carry incrementor. Therefore, there exists a need for an incrementor experiencing less signal propagation delay than the ripple carry while further requiring lesser area and device count than the carry lookahead and Kogge-Stone incrementors. In other words, an incrementor which would lie on the speed/area continuum between the ripple carry and the carry lookahead and Kogge-Stone incrementors.

Hence, it would be desirable to provide an incrementor with a carry-skip technique and method for modifying the incrementor such that the total signal propagation delay is minimized for an incrementor of a specific bit width.

BRIEF SUMMARY OF THE INVENTION

The present invention relates to a carry-skip incrementor including a plurality of circuit blocks, each circuit block including a varying number of cells which receive as input one data bit of an input operand as well as a carry signal. Each circuit block generates a product signal of the data bits input into that particular circuit block and real bit sums corresponding to these inputted data bits. Optimally, the circuit blocks are arranged so that a circuit block producing a most significant real bit sum has a least amount of cells and a circuit block producing a least significant real bit sum has the most cells. These circuit blocks may be bit stages or supergroup stages.

A plurality of logic gates are arranged such that each logic gate receives as input the product signal from one adjacent circuit block and the carry signal and outputs a new carry signal to the other adjacent circuit block. The logic gate transmits an active new carry signal if the product signal and the carry signal are active. Thus, the delay associated with the adjacent circuit block is bypassed in favor of the delay associated with the logic gate.

In its most simple configuration, the carry-skip incrementor comprises a first circuit block and a second circuit block having a logic gate coupled between the first and second circuit blocks. The first circuit block receives a carry signal via an input line and a first plurality of data bits of the input operand. The first circuit block generates real bit sums corresponding to the first plurality of data bits and a product signal being a logical AND'ing of the first plurality of data bits.

The logic gate is coupled to the first circuit block and the input line, receiving the product signal and the carry signal as input. The logic gate outputs a group carry propagate signal through a signal line, wherein the group carry propagate signal is active if both the product signal and the carry signal are active.

The second circuit block is coupled to the logic gate via the signal line in order to receive at least one of the plurality of data bits and the group carry propagate signal from the logic gate. As a result, if the group carry propagate signal is active, the second circuit block operates substantially in parallel with the first circuit block by avoiding any delay caused by the first circuit block.

BRIEF DESCRIPTION OF THE DRAWINGS

The features and advantages of the present invention will become apparent from the following detailed description of the present invention in which:

FIG. 2 is an illustrative embodiment of a computer system employing the present invention.

FIG. 3 is an illustrative block diagram of an embodiment of the carry-skip incrementor operating in tandem in which the collective operations of these devices emulate a counter.

DETAILED DESCRIPTION OF THE PRESENT INVENTION

Figure 1:
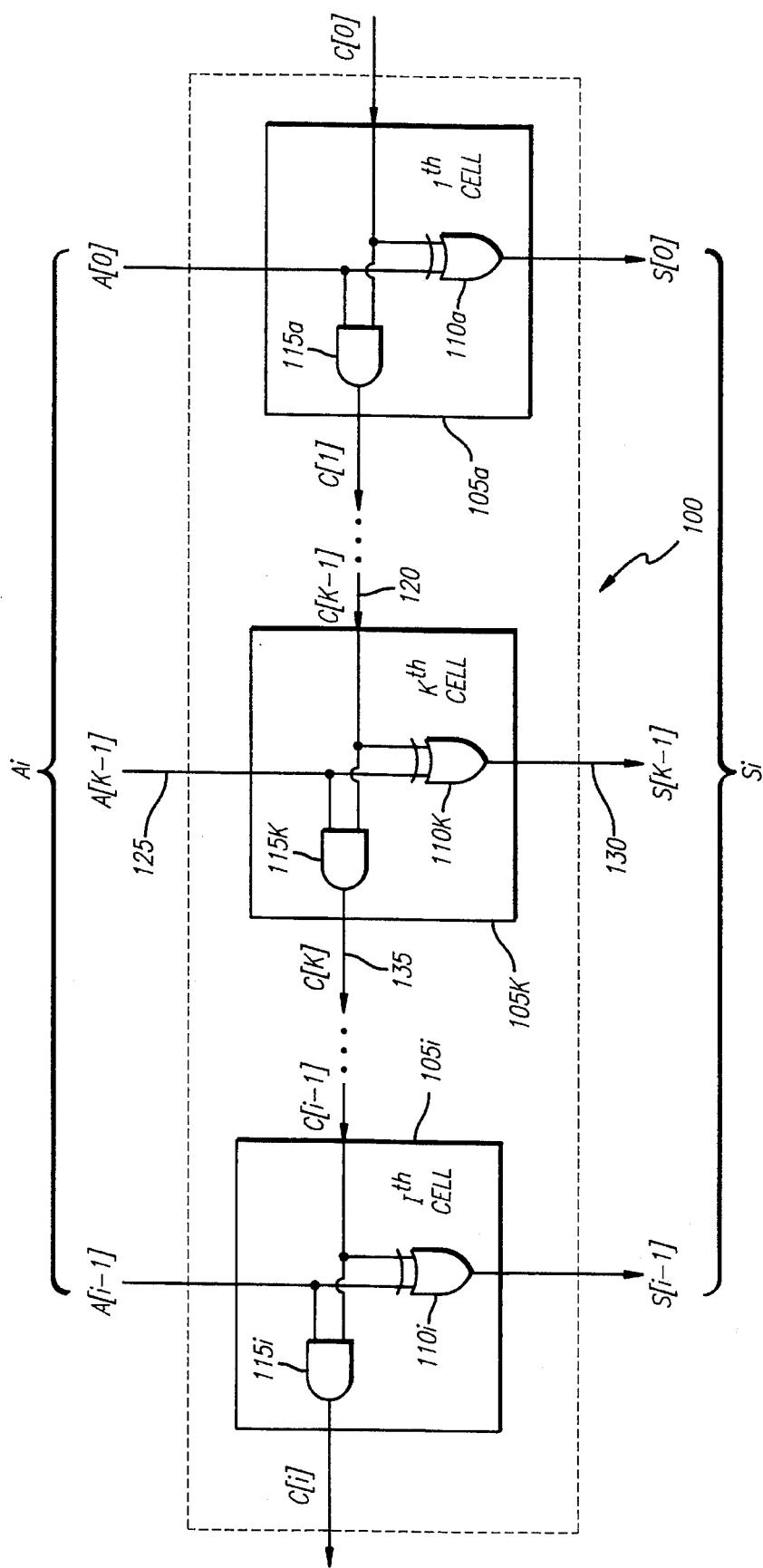
FIG. 1 illustrates a conventional ripple-carry incrementor which produces local ripple carry propagate and logical bit sums.

A carry-skip incrementor and method for increasing the operational speed of this incrementor is described below. In the following description, for purposes of explanation, specific details are set forth in order to provide a thorough understanding of the present invention. However, it will be apparent to one skilled in the art of circuit design that the present invention may be practiced in any integrated circuit device, especially processors, without these specific details. In other instances, well known operations, functions and devices are not shown in order to avoid obscuring the present invention.

Some portions of the detailed description which follow are presented in terms of algorithms and signal or bit representations which are the means used by those skilled in the art to most effectively convey the substance of their work to others skilled in the art. An "algorithm" is generally conceived to be a self-consistent sequence of steps leading to a desired result. The steps are those requiring physical manipulation of physical qualities, usually taking the form of electrical or magnetic signals (i.e., bits) capable of being stored, transferred, combined, compared or otherwise manipulated. A "set" of signals or bits being at least one signal or bit. An "active" signal or bit is representative of and interpreted by logic gates as a logic level "1" having a voltage normally between 3–5 Volts, inclusive. Meanwhile, an "inactive" signal or bit is representative of and interpreted by logic gates as a logic level "0" having a voltage normally between 0–2 Volts, inclusive. In addition, bit representations "Ai" or "$A_{i,y}$" signifies a collective of bits A[i−1]–A[0] and A[i−1], A[i−2]... A[y], respectively.

Referring to FIG. 2, an embodiment of a computer system 200 employing the present invention is illustrated. The computer system 200 generally comprises a display subsystem 210, a memory subsystem 220, a processor subsystem 230, all of which being coupled together by a bus 240 (e.g., an ISA bus, EISA bus, PCI bus, etc.) including address, data and control lines. The display subsystem 210 enables information to be displayed on a monitor 215 such as a cathode ray tube, flat panel display or any other monitor device. The memory subsystem 220 includes a memory controller 225 providing an interface for controlling access to at least one memory element 226 such as dynamic random access memory ("DRAM"), read only memory ("ROM"), video random access memory ("VRAM") and the like. The memory element 226 stores information and instructions for the processor subsystem 230. The processor subsystem 230 includes at least one processor 235 such as a complex instruction set computing ("CISC") processor, reduced instruction set ("RISC") processor or another type of microprocessor. A counter 250 is employed within the processor 235 in order to monitor certain events being performed or controlled by the processor 235.

Referring now to FIG. 3, the counter 250 is "n" bits wide to receive as input an operand An containing a current count value. The most significant "nm" bits of $A_n$ ("$A_{n,m}$") are input into a "n−m" bit carry-skip incrementor 300 via first input lines 405a and the least significant "m" bits of An (hereinafter referred to collectively as "$A_m$") 405b are input into the "m" bit adder 400 via second input lines 405b. The adder 400 further receives a "m" bit input ("$B_m$") via third input lines 410 representing the number of events being monitored that have occurred in the most current clock cycle. The adder 400 performs logical operations on $A_m$ and $B_m$ as well as outputs real bit sums "$S_m$" through output lines 415 and transmits a ripple carry "C[m]" signal to the skip-carry incrementor 300 through output lines 420. The carry-skip incrementor 300 receives the C[m] signal and, based on the value of C[m] signal, outputs real bit sums "$S_{n,m}$" through "n−m" output lines 425. These output lines 415 and 425 collectively represent the real bit sum "$S_n$". If the C[m] signal causes the carry-skip incrementor 300 to produce a carry (i.e., overflow), an active signal is transmitted through an overflow signal line 430 into a different part of the processor which takes some pre-programmed action.

Figures 4, 4A:
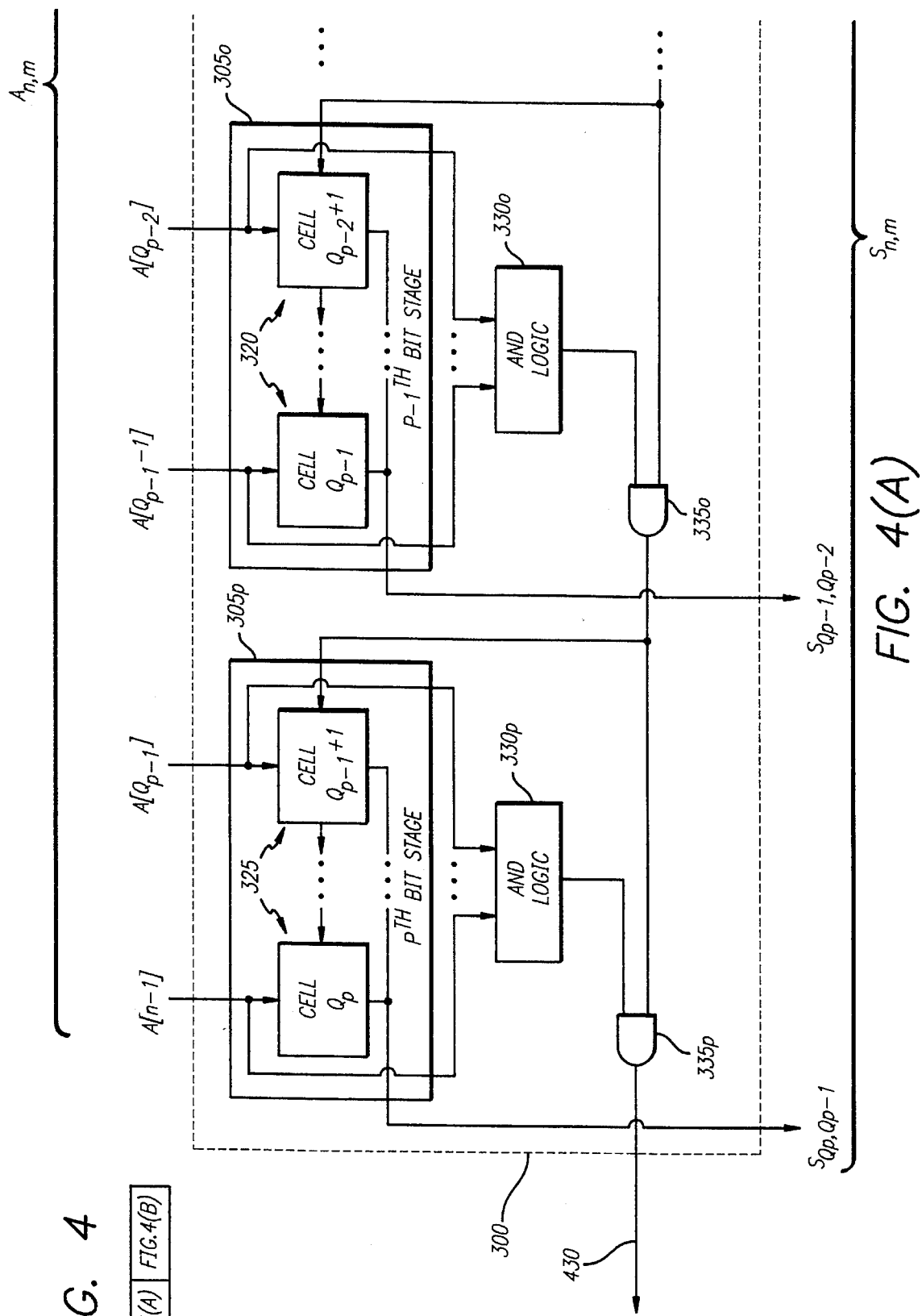
FIGS. 4A and 4B is an illustrative circuit diagram of an embodiment of the carry-skip incrementor including selective grouping of cells within certain bit stages to achieve minimum signal propagation delay.
Figure 4B:
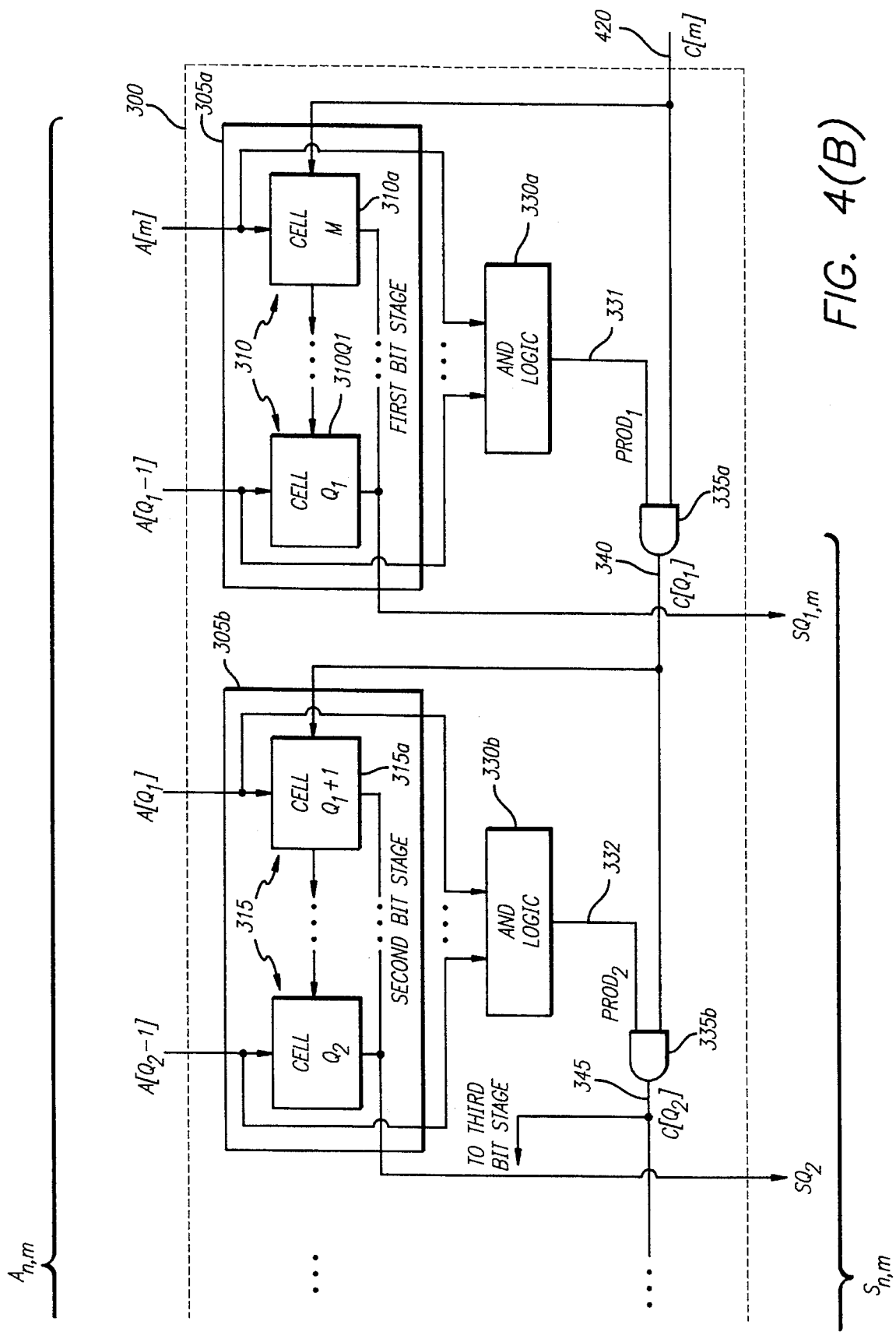

Referring to FIGS. 4A and 4B, a more detailed block diagram of the carry-skip incrementor 300 is provided. The carry-skip incrementor 300 comprises "p" bit stages 305a–305p ("p" being arbitrary), each bit stage 305a–305p being selectively grouped with serially coupled cells 310–325, respectively. The cells 310–325 are similar in physical construction to the cell identified in FIG. 1, although it is contemplated that such cells may be constructed using a variety of different logic gates (e.g., NAND, NOR, inverters, etc.) and still maintain the same functionality. The carry-skip incrementor 300 generally is arranged in a cascaded ripple fashion with a first bit stage 305a including "$h_1$" cells 310 ("$h_1$" being arbitrary) to calculate real bit sums $S_{Q1,m}$ (where $Q_1$="$h_1$+m" thereby including the $m^{th}$ real bit sum "S[m]") and a last block 305p including "$h_p$" cells 325 used to calculate real bit sums "$S_{Qp,Qp−1}$" (including the n−1$^{th}$ real bit sum "S[n−1]"). The manner in which the cells are arranged is described below.

As previously shown in FIG. 3, the carry-skip incrementor 300 receives as input $A_{n,m}$ bits of the operand An through the first input lines 405a and the ripple carry "C[m]" bit from the adder 400. Returning back to FIGS. 4A and 4B, a first cell 310a of the first bit stage 305a and a first carry propagate logic gate 335a receive as input the C[m] signal and each of the cells 310 receive corresponding "$h_1$" input bits from the operand (i.e., "$A_{Q1,m}$"). As a result, the cells 310 within the first bit stage 305a generate real bit sums "$S_{Q1,m}$" and appropriate bitwise ripple carries between the cells 310.

In addition, a first AND logic element 330a receives the $A_{Q1,m}$ signals concurrently with the first bit stage 305a. The AND logic element 330a, coupled to the first carry propagate logic gate 335a through signal line 331, is combinatorial logic arranged so that it produces a product output "$PROD_1$" signal of the operand bits associated with the first bit stage 305a. The $PROD_1$ signal is a resulting signal from a logical AND'ing of multiple inputs based on the following equation:

$$PROD_1 = A[m]^* A[m+1]^* \ldots {}^*A[Q_1-1], \text{ where } Q_1 > "m".$$

The implied assumption is that all product signals "$PROD_1$", "$PROD_2$" and the like are calculated prior to the arrival of its carry "C[m]" signal or its group carry propagate "$C[Q_i]$" signal.

Thus, the first carry propagate logic gate 335a, being preferably at least one gate operating as a logical AND, outputs an active group carry propagate "$C[Q_1]$" signal via a common bypass transmission line 340 into the second bit stage 305b if both $PROD_1$ signal and the C[m] signal are active. This provides an ability to bypass serial calculation of the group carry propagate associated with the first bit stage 305a prior to being input into the second bit stage 305b, if each bit of $A_{Q1,m}$ is active and the C[m] signal is active. Otherwise, if any bit of $A_{Q1,m}$ or the C[m] signal is inactive, an inactive $C[Q_1]$ signal is transmitted into the second bit stage 305b.

As a result, the first and second bit stages 305a and 305b virtually are operating in parallel and the total signal propagation delay associated with the first bit stage 305a of the carry-skip incrementor 300 is reduced to one gate delay instead of "$Q_1$" gate delays. Therefore, according to an implied assumption that all product signals "$PROD_p$" are ready by the time C[m] signal arrives, a maximum delay of the carry-skip incrementor 300 is reduced to the worst delay within one of the bit stages 305a–305p, not the sum of delays in propagating ripple carries across every cell as experienced by the ripple-carry incrementor.

Operating virtually concurrently with the first bit stage 305a, a second bit stage 305b receives appropriate input signals to perform its requisite operations. More specifically, a first cell 315a of the second bit stage 305b and a second carry propagate logic gate 335b receive as input the $C[Q_1]$ signal. Moreover, each of the cells 315 and a second AND logic element 330b receive corresponding "$Q_2-Q_1$" (where $Q_2 > Q_1$) input bits from the operand, namely $A_{Q2,Q1}$. As a result, the cells 315 within the second bit stage 305b generate ripple carry propagates (not shown) and real bit sums $S_{Q2,Q1}$. The second AND logic element 330b, being combinatorial logic similar to the first AND logic element, produces a product output "$PROD_2$" signal being equal to $A[Q_1]^* A[Q_1+1]^* \ldots {}^* A[Q_2-1]$. The second AND logic element 330b may slightly differ in construction from the first AND logic element 330a but is directed toward the same goal of logically AND'ing the inputs bits "$A_{Q2,Q1}$" of the second bit stage 305b.

Thereafter, the second carry propagate logic gate 335b, also operating as a logical AND gate, outputs an active group carry propagate "$C[Q_2]$" signal via another bypass transmission line 345 into the third bit stage if both $PROD_2$ and the $C[Q_1]$ signals are active. Otherwise, the $C[Q_2]$ signal is inactive. In any event, this $C[Q_2]$ signal avoids those gate delays which would have been imposed if the $C[Q_2]$ signal was calculated through ripple carry propagates of the second bit stage 305b.

The same above-described configurations and associated operations apply for each bit stage 305c–305p of the carry-skip incrementor 300 such that the total signal propagation delay to produce real bit sum "$S_{Qp}$" from the last bit stage 305p can be calculated through the following equation:

$$\text{Total Delay} = ((p-1) \times T_g + (Q_p - Q_{p-1} - 1)^* T_g + T_s,$$

where (i) "$Q_p - Q_{p-1}$" = Total number of cells within the last bit stage;

(ii) "p" = Total number of bit stages; and (iii) "$T_g$" = one gate delay; and (iv) "$T_s$" = delay to calculate sum $S_{Qp=Tg}$.

In order to minimize the total signal propagation delay, there needs to be a reduction in either the number of bit stages "p" or the total number of cells within the last bit stage 305p. Maintaining the number of bit stages to be constant, the total number of cells "$Q_p - Q_{p-1}$" within the last $p^{th}$ bit stage 305p may be reduced by shifting cells to other bit stages. Taking this to the extreme where only one cell remains in the last bit stage 305p, the total signal propagation delay is the following:

$$\text{Total Delay} = (p-1) \times T_g + T_{g=p \times T_g}.$$

To provide optimum performance of the carry-skip incrementor, the delay experienced by one bit stage to produce its corresponding real bit sum should be identical with the delay experienced by its succeeding and preceding bit stages. Thus, the real bit sums must be output at approximately the same time. Since the delay to produce "$S_{Qp-1,Qp-2}$" from the $p-1^{th}$ bit stage 305o is equal to $(p-2) \times T_g + (Q_{p-1} - Q_{p-2} - 1)^* T_g + T_s$, optimally, "$Q_{p-1} - Q_{p-2}$" must be equal to "2" since the group carry propagate $C[Q_{p-2}]$ for the $p-1^{th}$ bit stage 305o occurs one gate delay before the group carry propagate $C[Q_{p-1}]$ of the $p^{th}$ bit stage 305p. Thus, the $p-1^{th}$ bit stage 305o may support one more cell than the $p^{th}$ bit stage 305p and experience the same delay in producing its real bit sums. Thus, it is apparent that a sequence is obtained to calculate the maximum bit size of the carry-skip incrementor 300 which can maintain a total delay of "$p \times T_g$" being the following:

$$\Sigma i = 1 + 2 + 3 + 4 + \ldots + p = p \times (p+1)/2$$

Using the sequence, one may determine the smallest delay that may be used to support an incrementor having a bit width between $p \times (p+1)/2$ and $(p-1) \times p/2$. For example, to support a 37-bit incrementor, it would experience a minimum delay of nine (9) gates "$9T_g$" since, at most, a 36-bit carry-skip incrementor ($8 \times 9/2 = 36$) can operate with a delay of $8T_g$. Due to the fact that only thirty-seven (37) cells are required for the 37-bit incrementor and a 45-bit incrementor ($9 \times 10/2 = 45$) may be supported with a delay of $9T_g$. Thus, some cells within certain bit stages must be discarded or eliminated and thereafter, shifted to achieve optimal performance. This is because in reality (i) there are no AND and OR gates, only NAND and NOR gates; (ii) the delay across a three or more input NAND gate is different than the delay across a two-input NAND gate; (iii) and in some cases, the product signals ($PROD_1$, $PROD_2$, etc.) may not be ready before its corresponding ripple carry "C[m]" or group carry propagate "C[$Q_i$]". For example, simulations and diagnostics have determined that an optimal partition for the 37-bit incrementor would be eight bit stages (last-to-first) having 2-3-4-4-5-5-6-8 cells, respectively.

Figure 5:
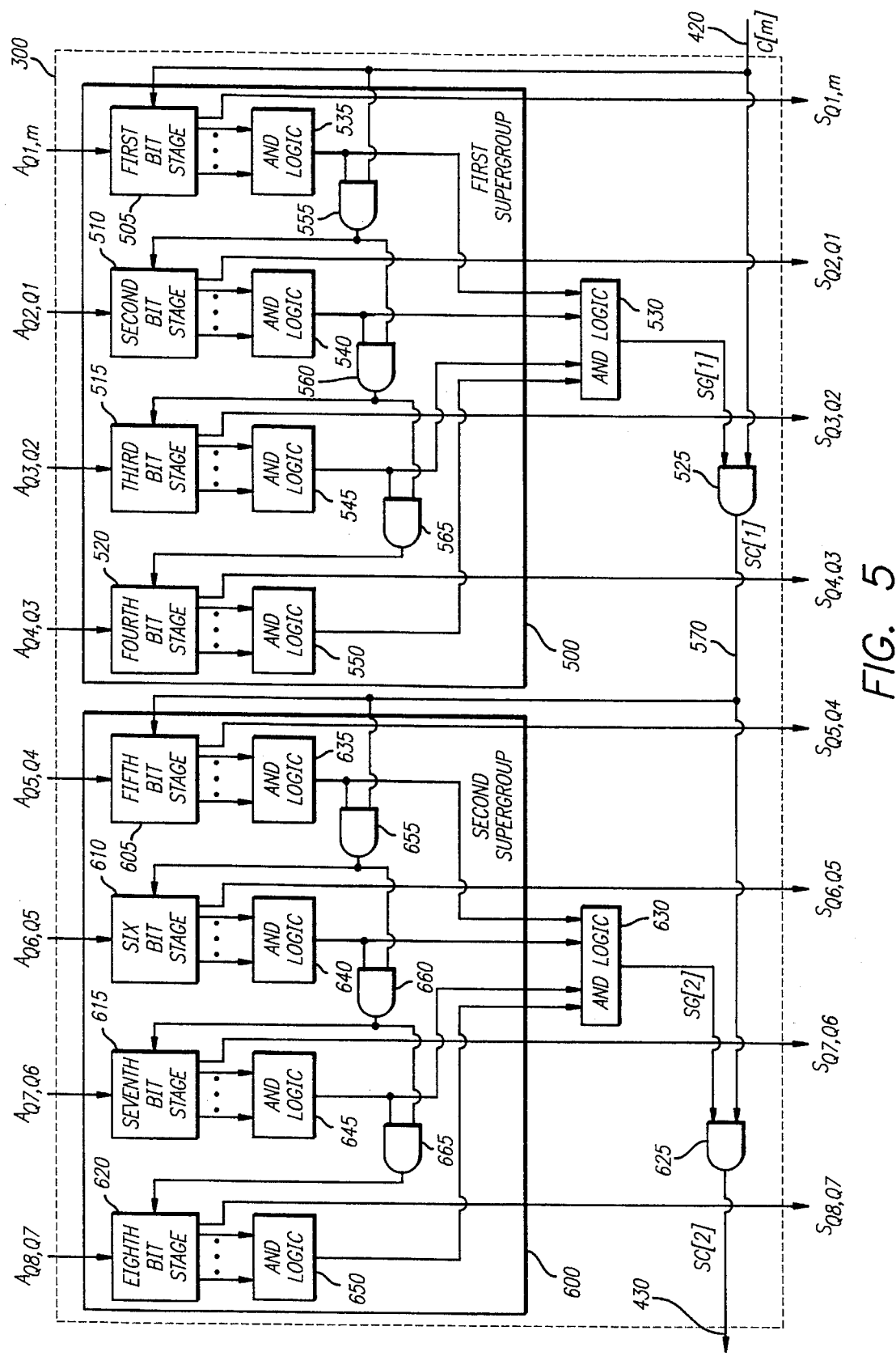
FIG. 5 is an illustrative circuit diagram of another embodiment of the carry-skip incrementor including selective grouping of bit stages within a chosen number of supergroup stages.

Referring now to FIG. 5, it is contemplated that this bit stage implementation may be only a first step in a recursive process. If the optimized cell grouping cannot meet specific requisite timing requirements, a second level of bit stages (i.e., supergroup stages) can be employed. For example, as shown in FIG. 5, two supergroup stages 500 and 600 are illustrated in which a first supergroup stage 500 includes four bit stages 505–520 and associated AND logic elements 535–550 while a second supergroup stage 600 includes four bit stages 605–620 and associated AND logic elements 635–650.

The first supergroup stage 500 and a first super-carry logic gate 525 receives as input a ripple carry "C[m]" input signal from the adder (not shown). More particularly, the C[m] signal is input into the first bit stage 505 and a first carry propagate logic gate 555. The first bit stage 505 further receives as input bits of the digital operand $A_{Q1,m}$; namely the number of bits corresponding to the number of cells within the first bit stage 505. For understanding this recursive embodiment, the first bit stage 505 is intentionally shown to be equivalent to the first bit stage of FIG. 4. However, it is contemplated that "$Q_1$" is arbitrary and will be appropriately configured to optimally reduce signal propagation delays.

The first bit stage 505 calculates the real bit sums "$S_{Q1,m}$" and outputs $S_{Q1,m}$ through output lines 506. Moreover, the first bit stage 505 transfers the $A_{Q1,m}$ bits into the first AND logic element 535 which generates the "$PROD_1$" signal being input into both the first carry propagate logic gate 535 and a first supergroup AND logic element 530 being combinatorial logic logically AND'ing all its product input signals "$PROD_1$–$PROD_4$". The first carry propagate logic gate 555 generates a group carry propagate "C[Q1]" signal based on both its C[m] signal and $PROD_1$ signals into the second bit stage 510 and a second carry propagate logic gate 560.

The second, third and fourth bit stages 510–520 undergo operations similar to those enumerated above. The $PROD_2$–$PROD_4$ signals associated with each bit stage 510–520 are input into the first supergroup AND logic element 530. The first supergroup AND logic element 530 outputs a product output "SG[1]" signal to the first super-carry logic gate 525 which, in combination with the C[m] signal produces a super-carry propagate "SC[1]" signal through a bypass line 570. The SC[1] signal is input into a fifth bit stage 605 incorporated within the second supergroup 600.

The second supergroup 600 operates in a manner identical to the first supergroup 500 to produce those remaining real bit sums "$S_{Q8,Q4}$". More specifically, the second supergroup 600 receives as input "$A_{Q8,Q4}$" and the SC[1] signal from the first super-carry propagate logic gate 525. The SC[1] signal is further utilized to calculate group carry propagates between the bit stages 605–620 being the outputs of carry propagate logic gates 655–665 and to determine whether an overflow condition has occurred. An overflow condition occurs when a second super-carry logic gate 625 outputs an active super-carry propagate "SC[2]" signal, where the SC[2] signal is a logical AND'ing of a product output "SG[2]" signal from a second supergroup AND logic element 630 and an active SC[1] signal along bypass line 570.

The present invention described herein may be designed in many different embodiments evident to one skilled in the art than those described without departing from the spirit and scope of the present invention. For example, although non-inverting standard TTL logic gates have been set forth, it is contemplated that inverting standard TTL logic gates, CMOS gates and BiCMOS gates and the like may be used. The invention should, therefore be measured in terms of the claims which follow.

What is claimed is:

1. An integrated circuit device, receiving an digital operarid having a plurality of data bits and generating a plurality of real bit sums, comprising:

an input line propagating a carry signal;

a first stage coupled to said input line, said first stage includes
      a first set of cells that receive said carry signal via said input line and a first set of data bits being less in number than the plurality of data bits and subsequently generate a first plurality of real bit sums corresponding in number to said first set of data bits, and
      a logic element that logically ANDs said first set of data bits to produce a product signal;

a logic gate coupled to said logic element of said first stage and said input line, said logic gate receives said product signal and said carry signal and outputs a group carry propagate signal through a signal line, said group carry propagate signal being active if both said product signal and said carry signal are active; and a second stage coupled to said logic gate via said signal line, said second stage includes a second set of cells lesser in number than said first set of cells that receive a second set of data bits and said group carry propagate signal from said logic gate so that said second stage operates substantially in parallel with said first stage when said group carry propagate signal is active.

2. The integrated circuit device according to claim 1, wherein said first stage receives at least a least significant bit of said plurality of data bits and said carry signal from an external source, wherein said first stage generates a least significant bit of said plurality of real bit sums.

3. The integrated circuit device according to claim 1, wherein said carry signal input into said first stage is a group carry propagate signal from a logic gate corresponding to a prior stage.

4. The integrated circuit device according to claim 1, wherein said second stage includes said second set of data bits being equal to a difference of said plurality of data bits and said first set of data bits.

5. The integrated circuit device according to claim 4, wherein said second stage receives at least a most significant bit of said plurality of data bits and said group carry propagate signal from said logic gate, wherein said second stage generates at least a most significant bit of said plurality of real bit sums.

6. The integrated circuit device according to claim 1, wherein said first stage is a supergroup stage including:

a first bit stage receiving said carry signal via said input line and a third set of data bits being less in number than said first set of data bits and generating a third set of real bit sums of said first plurality of real bit sums and a bit stage product signal being a logical AND'ing of said third set of data bits;

a group logic gate coupled to said first bit stage and said input line, said group logic gate receives said bit stage product signal and said carry signal and outputs a carry propagate signal through a group signal line, said carry propagate signal being active if both said bit stage product signal and said carry signal are active; and a second bit stage coupled to said group logic gate via said group signal line, said second bit stage (i) receives a fourth set of data bits being at most equal in number to said third set of data bits, wherein said third and fourth set of data bits are equal in number to said first plurality of real bit sums, and said carry propagate signal from said group logic gate so that said second bit stage operates substantially in parallel with said first bit stage when said carry propagate signal is active and (it) generates a fourth set of real bit sums lesser in number than said third set of real bit sums.

7. The integrated circuit device according to claim 6, wherein said second circuit block is a supergroup stage including at least one bit stage.

8. An integrated circuit device receiving a digital operand having a plurality of data bits and generating a plurality of real bit sums, comprising:

bus means for propagating a carry signal;

first stage means for receiving said carry signal and a first set of data bits being less in number than said plurality of data bits and for generating a first set real bit sums corresponding to said first set of data bits and a product signal, said first stage means being coupled to said bus means;

logic means for receiving said product signal and said carry signal and for outputting a group carry propagate signal being active if both said product signal and said carry signal are active, said logic means being coupled to said bus means and said first stage means; and second stage means for receiving a second set of data bits lesser in number than said first set of data bits and said group carry propagate signal so that said second stage means operates substantially in parallel with said first stage means when said group carry propagate signal is active in order to avoid a propagation delay caused by said first stage means, said second state means being coupled to said logic means.

9. The integrated circuit device according to claim 8, wherein said first stage means includes first bit stage means for generating said first set of real bit sums based on said first set of data bits and said carry signal; and logical means for collectively producing said product signal being a logical AND'ing of said first set of data bits.

10. The integrated circuit device according to claim 9, wherein said first bit stage means includes a first set of cells, wherein a first cell of said first set of cells (i) receives said carry signal and a first data bit of said first set of data bits and (ii) generates a first real bit sum of said first set of real bit sums and a ripple carry for use by a second cell of said first set of cells.

11. The integrated circuit device according to claim 9, wherein said second stage means includes second bit stage means for generating a second set of real bit sum of said plurality of real bit sums.

12. The integrated circuit device according to claim 11, wherein said second bit stage means includes at least one cell directly receiving said group carry propagate signal and said at least one of said second set of data bits.

13. The integrated circuit device according to claim 8, wherein said carry signal input into said first stage means is a second group carry propagate signal.

14. The integrated circuit device according to claim 8, wherein said first stage means is a supergroup stage means including:

first bit stage means for receiving said carry signal via said bus means and a third set of data bits being less in number than said first set of data bits, said first bit stage means further generating a third set of real bit sums and a stage product signal being a logical AND'ing of said third set of data bits;

group logic means for receiving said stage product signal and said carry signal and for outputting an active carry propagate signal through a group signal line if both said stage product signal and said carry signal are active, said group logic means is coupled to said first stage means and said bus means; and second bit stage means for receiving a fourth set of data bits being at most equal in number to said third set of data bits and said carry propagate signal from said group logic means so that said second bit stage means operates substantially in parallel with said first bit stage means when said carry propagate signal is active to avoid a propagation delay caused by said first bit stage means, said second bit stage means further generating a fourth set of real bit sums.

15. The integrated circuit device according to claim 14, wherein said second stage means is a supergroup stage including at least one bit stage means.

16. A computer system comprising:

a memory subsystem including a memory element containing a digital operand being a plurality of digital data bits;

a processing subsystem including a processor which performs logical operations on said digital operand, said processor including an integrated circuit device performing arithmetic operations on said first digital operand to produce a plurality of real bit sums, said integrated circuit device comprising:

a first stage coupled to said input line, said first stage includes a first set of cells that receive said carry signal via said input line and a first set of data bits being less in number than said plurality of data bits and subsequently generate a first set of real bit sums corresponding in number to said first set of data bits, and a logic element that logically ANDs said first set of data bits to produce a product signal, a logic gate coupled to said logic element of said first stage and said input line, said logic gate receives said product signal and said carry signal and outputs a group carry propagate signal through a signal line, said group carry propagate signal being active if both said product signal and said carry signal are active, and a second stage coupled to said logic gate via said signal line, said second stage includes a second set of cells lesser in number than said first set of cells that receives a second set of data bits and said group carry propagate signal from said logic gate so that said second stage operates substantially in parallel with said first stage when said group carry propagate signal is active, said second bit stage further generates a second set of real bit sum; and a bus coupled to said memory subsystem and said processing subsystem, said bus enables communication between said memory element of said memory subsystem and said processor of said processing subsystem.

17. The computer system according to claim 10, wherein said first stage receives at least a least significant bit of said plurality of data bits and said carry signal from an external source, wherein said first stage generates a least significant bit of said plurality of real bit sums.

18. The computer system according to claim 16, wherein said carry signal input into said first stage is a group carry propagate signal from a logic gate corresponding to a prior stage.

19. The computer system according to claim 16, wherein said second stage includes said second set of data bits being equal to a difference of said plurality of data bits and said first set of data bits.

20. The computer system according to claim 19, wherein said second stage receives at least a most significant bit of said plurality of data bits and said group carry propagate signal from said logic gate, wherein said second stage generates at least a most significant bit of said plurality of real bit sums.

21. The computer system according to claim 16, wherein said first stage is a supergroup stage including:
- a first bit stage receiving said carry signal via said input line and a third set of data bits being less in number than said first set of data bits and generating a third set of real bit sums of said first plurality of real bit sums and a bit stage product signal being a logical AND'ing of said third set of data bits;
- a group logic gate coupled to said first bit stage and said input line, said group logic gate receives said bit stage product signal and said carry signal and outputs a carry propagate signal through a group signal line, said carry propagate signal being active if both said bit stage product signal and said carry signal are active; and
- a second bit stage coupled to said group logic gate via said group signal line, said second bit stage receives a fourth set of data bits being at most equal in number to said third set of data bits and said carry propagate signal from said group logic gate so that said second bit stage operates substantially in parallel with said first bit stage when said carry propagate signal is active.

22. The computer system according to claim 21, wherein said second bit stage is a supergroup stage including at least one bit stage.

23. A method for incrementing a digital operand having a plurality of digital data bits, the method comprising the steps of:
- transmitting a first set and a second set of said plurality of digital data bits into a first stage and a second stage respectively, wherein said first set of said plurality of data bits is greater in number than said second set;
- deriving a group carry propagate signal based on a product signal being a logical AND'ing of said first set of said plurality of digital data bits input into said first stage and a carry signal from an external source;
- transmitting said group carry propagate signal into said second stage; and
- calculating a first set of real bit sums based on said first set of said plurality of digital data bits and said carry signal concurrently with calculation of a second set of real bit sums based on said second set of said plurality of digital data bits and said group carry propagate signal.

24. A computer system comprising:
- memory means for storing a digital operand being a plurality of digital data bits;
- means for processing said digital operand, said processing means including an integrated circuit device performing arithmetic operations on said digital input to produce a plurality of real bit sums, said integrated circuit device including:
  - bus means for propagating a carry signal;
  - first stage means for receiving said carry signal and a first set of data bits being less in number than said plurality of data bits and for generating a first set real bit sums corresponding to said first set of data bits and a product signal, said first stage means being coupled to said bus means;
  - logic means for receiving said product signal and said carry signal and for outputting a group carry propagate signal being active if both said product signal and said carry signal are active, said logic means being coupled to said bus means and said first stage means; and
  - second stage means for receiving a second set of data bits lesser in number than said first set of data bits and said group carry propagate signal so that said second stage means operates substantially in parallel with said first stage means when said group carry propagate signal is active in order to avoid a propagation delay caused by said first stage means, said second stage means being coupled to said logic means.

25. The computer system according to claim 24, wherein said first stage means includes
- first bit stage means for generating said first set of real bits sums based on said first set of data bits and said carry signal; and
- logical means for collectively producing said product signal being a logical AND'ing of said first set of data bits.

26. The computer system device according to claim 25, wherein said first bit stage means includes a first set of cells, wherein a first cell of said first set of cells (i) receives said carry signal and a first data bit of said first set of data bits and (ii) generates a first real bit sum of said first set of real bit sums and a ripple carry for use by a second cell of said first set of cells.

27. The computer system device according to claim 25, wherein said second stage means includes second bit stage means for generating a second set of real bit sum of said plurality of real bit sums.

28. The computer system device according to claim 27, wherein said second bit stage means includes at least one cell directly receiving said group carry propagate signal and said at least one of said second set of data bits.

29. The computer system device according to claim 24, wherein said carry signal input into said first stage means is a second group carry propagate signal.

30. The computer system device according to claim 24, wherein said first stage means is a supergroup stage means including:
- first bit stage means for receiving said carry signal via said bus means and a third set of data bits being less in number than said first set of data bits, said first bit stage means further generating a third set of real bit sums and a stage product signal being a logical AND'ing of said third set of data bits;
- group logic means for receiving said stage product signal and said carry signal and for outputting an active carry propagate signal through a group signal line if both said stage product signal and said carry signal are active; and
- second bit stage means for receiving a fourth set of data bits being at most equal in number to said third set of data bits and said carry propagate signal from said group logic means so that said second bit stage means operates substantially in parallel with said first bit stage means when said carry propagate signal is active to avoid a propagation delay caused by said first bit stage means.

31. The computer system device according to claim 30, wherein said second bit stage means is a supergroup stage including at least one bit stage means.

* * * * *

UNITED STATES PATENT AND TRADEMARK OFFICE
CERTIFICATE OF CORRECTION

PATENT NO. : 5,555,517
DATED : September 10, 1996
INVENTOR(S) : Agrawal et al.

It is certified that error appears in the above-indentified patent and that said Letters Patent is hereby corrected as shown below:

In column 1 at line 54 delete "A[-2]" and insert --A[k-2]--

In column 8 at lines 9-10 delete "operarid" and insert --operand--

In column 9 at line 16 delete "operarid" and insert --operand--

In column 10 at lines 28-29 delete "operarid" and insert --operand--

In column 10 at line 59 delete "claim 10" and insert --claim 16--

In column 11 at line 34 delete "operarid" and insert --operand--

Signed and Sealed this

Seventeenth Day of December, 1996

Attest:

BRUCE LEHMAN

Attesting Officer    Commissioner of Patents and Trademarks